United States Patent Office 2,968,615
Patented Jan. 17, 1961

---

2,968,615

SOLVENT EXTRACTION OF AROMATIC FROM ALIPHATIC HYDROCARBONS USING BETA HYDROXY ETHYL-M-TOLYL SULFIDE OR BETA HYDROXY ETHYL PHENYL SULFIDE

Charles O. Petty, Tyler, Tex., assignor of one-half to The La Gloria Oil and Gas Company, Tyler, Tex., a corporation of Delaware No Drawing. Original application Oct. 29, 1957, Ser. No. 693,040. Divided and this application Apr. 28, 1959, Ser. No. 809,338

3 Claims. (Cl. 208—322)

This invention is a division of my copending application Serial No. 693,040, filed October 29, 1957, now U.S. Pat. No. 2,927,946, which in turn is a continuation-in-part of my copending application Serial No. 565,289, filed December 21, 1955, now U.S. Pat. No. 2,862,804 and relates to a phenol catalyzed reaction of organic thiol compounds with epoxides, to purification of crude commercial acid phenolic oils to remove sulfur compounds, and to novel composition of matter comprising the reaction product of organic thiol compounds with epoxides formed in that reaction.

According to this invention I have discovered that a pure phenol or commercial mixtures of acid phenolic compounds, or solutions of acid phenols containing phenols in substantial concentration, usually exceeding about 5 volume percent of a commercial phenol solution in a solvent, catalyzes the reaction between an organic epoxide and an organo thiol (mercaptan). Such mercaptans usually occur as impurity in the commercial phenols, whereby the mercaptans are converted to hydroxy hydrocarbon thiol ethers and the commercial phenol can be purified thereby either merely to deodorize or by further treatment to remove the sulfur compounds.

Notwithstanding epoxides are known to react readily with phenols, I have found that the epoxide will react selectively and preferentially with the organic thiols in the presence of a large quantity of phenols at ambient to moderately raised temperatures up to about 75° C., even when the thiols are present in admixture with the phenols in very small or trace quantities. The selective thiol reaction takes place at low, such as ambient temperature, and to a substantial degree up to about one-half to two hours more or less rapid depending on the character of the mercaptan. However, the yield becomes quantitative and the reaction runs more rapidly in the higher portion of the temperature range.

The reaction product of the expoxide with the thiols, particularly thiophenols and thiocresols comprising hydroxy hydrocarbon thioethers are valuable products per se which are useful in certain applications such as an extraction solvent to selectively separate aromatic type hydrocarbon from aliphatic type hydrocarbon and as stabilizers for cracked gasoline.

Thus, according to the present invention crude commercial mixtures of phenols, such for example as crude tar acids separated as a tar acid oil fraction in coal tar distillation, or crude petroleum phenols separated from thermally or catalytically cracked petroleum naphthas which contain mercapto compounds such as thiophenols, thiocresols, thioxylenols, and lower molecular weight aliphatic mercaptans may be purified to convert the mercaptan, or even hydrogen sulfide contained as an impurity in the acid phenolic oil to thio ethers by reaction with the organo epoxide. Other commercial phenols, such as may be formed synthetically, for instance, where benzene, toluene or xylene contaminated with sulfur compounds are converted by synthetic procedures to phenols, such phenols may be purified by the present method to remove any contaminating thiophenols or other mercaptans.

The predominant reaction which occurs is shown in the following equations:

(1) Thiophenol

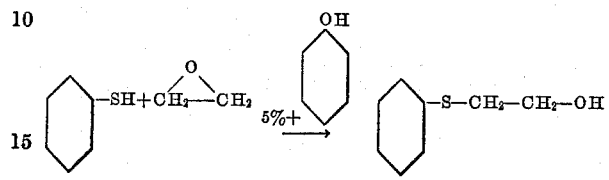

(2) m-Thiocresol

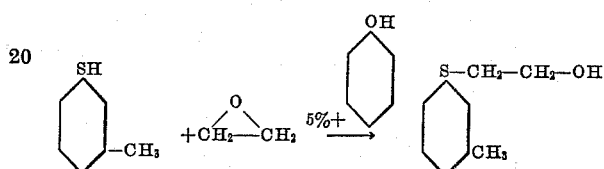

(3) N-amyl mercaptan

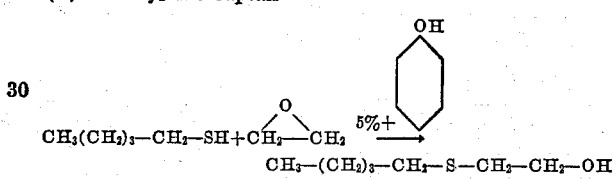

As will be noted, that reaction is very actively and selectively catalyzed by the phenol present in substantially large quantities in the reaction mixture. It is surprisingly reactive because the phenol will catalyze that reaction to substantially quantitative yields whereby all of the mercapto compound is converted to epoxide derivative, for instance, hydroxy alkylene thio ether when the epoxide used is an alkylene oxide, and at a temperature up to about 75° C.

The reaction is surprising in that phenols themselves, known to react with alkylene oxides, do not appear to react in the presence of the sulfur compounds at such moderately low temperatures so that the reaction goes to completion whereby the alkylene oxide may be substantially stoichiometric with respect to the mercapto compound or may be used in slight excess as desired without substantial loss of phenols. The phenols, only in the presence of an excess of alkylene oxide and at a temperature above about 75° C., begin to react with the excess alkylene oxide after the mercaptans have reacted. As stated, the reaction goes to completion and it may be slightly accelerated to reduce the reaction time by raising the temperature from about ambient, such as 25° C., up to about 75° C. Although substantially raised temperatures are not esential it is preferred to carry out the reaction in the temperature range of about 40° to 60° C. to enhance the reaction rate.

The term epoxide as used herein is intended to define a compound containing an olefine oxide group having the following structure:

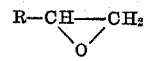

R may be hydrogen or an organic, preferably hydrocarbon radical, aliphatic, cyclo aliphatic, or aromatic carbocyclic. It is preferred to use lower alkylene oxides wherein R is a 1 or 2 carbon atom alkyl, or hydrogen, because these are more easily handled, and react more rapidly and efficiently. Useful higher epoxides usually for purposes other than sweetening include amylene oxide, cyclohexene oxide, styrene oxide, epichlorohydrin, glycide, decene oxide, butadiene oxide and the like.

While, as indicated, other epoxides are useful and any of the type mentioned above will be used to form corresponding hydroxy hydrocarbon thio ether derivatives of the mercaptans present in the phenolic oil, where the commercial phenolic oil is merely to be purified as a primary objective to obtain pure phenols free of mercaptan, it is preferred to use a lower alkylene oxide, usually having up to 5 carbon atoms, preferably 2 or 3, typical examples of which are ethylene oxide, propylene oxide, butylene oxide and amylene oxide.

The crude phenolic acid oil usefully purified by the present invention comprises a 5 to 100 volume precent phenolic oil solution. Such solution may contain from mere traces, i.e. less than .00001 percent of organic mercaptan, up to a highly contaminating quantity of mercaptan such as 10 to 15% or higher. The remainder of the solution comprises phenols, other acidic substances often occurring therewith in commercial phenolic extracts such as naphthenic acids, and solvents such as water, hydrocarbon and the like.

In the practice of this invention the epoxide may merely be added in slight molar excess to the mercaptan content of the phenol solution, desirably with slight warming of the solution. It is sometimes desirable, but not necessary, to add the ethylene oxide dissolved in a hydrocarbon solvent. preferably an aliphatic type naphtha, for example, gasoline comprising a $C_6$ to $C_9$ hydrocarbon fraction of a virgin naphtha comprising hexane or heptane, etc., in concentration from 2 to 5% epoxide in the hydrocarbon by volume. That hydrocarbon solution is then agitated with the sulfur contaminated phenolic acid oil in quantity such that the epoxide is at least sufficient to react with the mercaptan sulfur present. That reaction, as stated, may take place at ambient temperature up to 75° C., but preferably the temperature is held to the range from about 40 to 60° C. By proper selection of a solvent the combined mixing, heating and timing of the reaction may be effected by selection of a hydrocarbon solvent boiling in this range, such as a narrower cut petroleum naphtha, and heating the mixture to reflux. Higher pressures may be used where the method is applied as part of a synthetic production or refining system operating under pressure; or to prevent vaporization during the contact, but otherwise raised pressures are not essential for this reaction.

The hydroxy hydrocarbon thio ethers formed are preferentially soluble in the hydrocarbon solvent. Any phenols tending as such to dissolve in the hydrocarbon solvent may be washed or extracted out with water. Alternatively after finally extracting the sulfur compounds from the acid phenolic oils, any phenolic oils remaining in the hydrocarbon solvent solution of thio ethers may be extracted with aqueous alkali. That aqueous alkali solution may be acidified and returned to the sulfur free phenolic oil raffinate.

The purified acid phenolic oils may be distilled to separate individual phenols as desired.

The hydroxy thio ether reaction product dissolved in hydrocarbon solvent is then purified by distilling off the solvent and fractionally distilling to separate pure hydroxy alkylene thio phenols and cresols or other thio ethers present, depending upon the particular organic epoxide that was used.

While there are advantages to obtaining high yields and ready extraction of the thio ethers formed in the phenolic oil when the epoxide is dissolved in a hydrocarbon solvent before contact with mercaptan containing phenolic oil, the epoxide can merely be added directly to the mercaptan containing phenolic oil without a solvent and the solution agitated and/or warmed to reaction under reflux of the epoxide. The mercapto compounds when present in mere traces need not be removed, the phenolic oil being merely sweetened by this reaction to convert the malodorous mercaptans to thio ethers. Moreover, larger quantities of thio ethers may be removed by distillation since they usually boil at temperatures substantially higher than the phenols and will be recovered as residue when the phenols are distilled.

Moreover, it is found that the epoxides, particularly the lower alkylene epoxides, react with aromatic mercaptans present in the acid phenolic oil such as thio phenols, more rapidly at lower temperatures than with the aliphatic mercaptans. Accordingly, it is possible to obtain additional selectivity by first reacting the mercaptan contaminated phenolic oil with the epoxides, such as a lower alkylene oxide, at the low generally ambient temperatures such as below about 40° C. and for short periods of time such as less than about 30 minutes. These more aromatic thio ethers thus formed which will be predominantly hydroxy alkylene thiophenol ethers, may be extracted with a solvent from the other less reactive mercaptans contained in the phenolic oil. Alternatively thio ethers may be separated from the phenols and aliphatic mercaptans by distillation since contaminating and apparently slower reacting aliphatic mercaptan will remain in the phenolic oil raffinate or distillate.

Of course, as indicated above, all of the mercaptan compounds may be caused to react by heating up to about 75° C., preferably in the range of 40 to 60° C., for short periods up to about one hour, usually less than 30 minutes, such as about 15 minutes, or for longer periods from about 1 to 2 hours depending upon the epoxide and character of the mercaptans.

Moreover, epoxides such as the lower alkylene oxides will react quantitatively with all of the mercaptan that may be present in the phenolic oil at ambient temperature if a sufficient quantity of epoxide is used, at least stoichiometric to the mercaptan present, providing sufficient time of contact is allowed between the reagents. Thus, the aromatic mercaptans such as thiophenols and thiocresols react rapidly and at lower temperatures with the epoxide. The aliphatic mercaptans react very slowly at low temperatures. Hence, the mixture of mercaptan-containing phenols containing some aliphatic mercaptan needs to be contacted for about 3–10 hours and sometimes longer at ambient temperature for complete reaction. However, as stated, warming slightly will cause the reaction to go to completion in a much shorter period.

The reaction of the thiophenol with the lower alkylene oxide such as ethylene oxide, appears to be exothermic and rapid, whereas reaction of the ethylene oxide with other mercaptans may be more slow and endothermic.

Accordingly, it will appear that there is considerable versatility and selectivity in this reaction to produce a desired type of thio ether by reaction with epoxide of certain mercaptans to the substantial exclusion of others, or to running the reaction to completion or to an intermediate yield, at a desired temperature.

The following examples illustrate the practice of this invention.

EXAMPLE I 100 grams of a commercial mixture of tar acids formed by distilling coal tar and obtained as a carbolic oil comprising a fraction of the tar distilling in the range of 170 to 230° C. and containing 1.2 grams of mercapto compounds predominantly thiophenols, was treated by passing 3 grams of ethylene oxide gas into the acid phenolic oil over a period of 30 minutes while maintaining the acid oil at a temperature of 55° C. and with rapid agitation, the excess ethylene oxide being returned to the reaction mixture as reflux from an ice cooled condenser. The said phenolic oil was found to have a copper number of zero which indicated that no free mercaptan remained.

EXAMPLE II

A catalytically cracked naphtha was washed with a 30% caustic soda solution in water to remove alkali soluble components comprising predominantly phenols. The solution was acidified and the acid oils containing a small quantity of water was separated as an insoluble layer and distilled. The following table shows the characteristics of the acid oil:

*Acid oil extract of catalytic naphtha*

|  | Temp., °F. | Specific Gravity | Percent RSH | Percent of Total | Fraction No. |
|---|---|---|---|---|---|
| Cat. Naphtha Acid Oil |  | 1.0215 | 8.0 |  | (311–438) |
| Distillation: |  |  |  |  |  |
| IBP | 311 |  |  |  |  |
| 10 | 374 |  |  |  | 1 |
| 20 | 380 | 1.0327 | 9.5 | 14.3 | (311–378) |
| 30 | 380 |  |  |  | 2 |
| 40 | 383 | 1.0314 | 8.6 | 30.0 | (378–385) |
| 50 | 386 |  |  |  |  |
| 60 | 388 |  |  |  |  |
| 70 | 392 |  |  |  | 3 |
| 80 | 396 | 1.0194 | 6.5 | 30.0 | (385–401) |
| 90 | 406 | 1.0144 | 4.9 | 22.3 | 4 (401–428) |
| 95 | 438 |  |  |  |  |
| E.P. | 438 |  |  |  |  |

A fraction comprising a first fraction boiling up to 378° F. and comprising 14.3% of the total acid phenol distillate containing 9.5% of mercaptan had a total of two grams of gaseous ethylene oxide (about 200% theoretical) bubbled through the liquid with agitation over a period of 5 minutes, no extraneous heat being applied, some slight warming up to about 40° F. taking place by the heat evolved by reaction, the excess unreacted ethylene oxide being continuously returned to the reaction mixture by an ice cooled reflux condenser. After 5 minutes the excess ethylene oxide was removed by allowing it to evaporate at room temperature and the mercaptan content of the oil was analyzed and found to be reduced approximately 20%. The second fraction of the distillate oil having the characteristics set forth on the table was treated similarly and with the same quantity of ethylene oxide. The mercaptan content of that fraction was found to be reduced 85%. In a similar way the third fraction of the table similarly treated was found to have its mercaptan content reduced 95% and the fourth fraction 100%. The experiment shows that the order of reactivity of the higher mercapto compounds appearing in the higher boiling fraction is much greater, and the aromatic thio phenols associated with the higher boiling fractions are reacted more rapidly and to a greater degree at low temperature.

EXAMPLE III

The experiment of Example II was repeated with the first three fractions except that the phenolic oil in each case was heated to 60° C., the excess ethylene oxide being continuously returned to the warm phenolic oil as reflux from the ice cooled condenser. In a period of 30 minutes of heating under these conditions, analysis of the first fraction showed no mercaptan sulfur remaining in the phenolic oil. Similarly fractions two and three showed no mercaptan remaining in the phenolic oil.

EXAMPLE IV

In order to check the rate of reaction against a pure synthetic mixture, a 100 gram mixture of pure metacresol in quantity of 98%, thiophenol in quantity of 1%, and metathiocresol in quantity of 1%, all quantities being by weight, were shaken for 15 minutes with 2 grams of ethylene oxide, at room temperature of 24° C. in a closed bottle and the mercaptan was analyzed and found to be 20% reduced. The shaking was continued at room temperature and after 30 minutes total time the mixture again was analyzed and the mercaptan found to be 60% reduced. The shaking was again continued and the mixture again analyzed after an hour and the mercaptan was found to be 90% reduced, and finally, after shaking for a total time of 1¾ hours the mercaptan was found to be 100% converted to the thio ether.

EXAMPLE V

Another synthetic 100 gram mixture was made using 97.5% of pure metacresol, 1% thiophenol, 1% metathiocresol and 0.5% of N-butyl mercaptan, all quantities being by weight. This mixture, as in Example IV, was shaken at the same ambient temperature with 3 grams of ethylene oxide in a bottle. Analysis after 15 minutes showed 20% reduction of the mercaptan; after 30 minutes 50% reduction of the mercaptan; after 1 hour 75% reduction of the mercaptan and after 2 hours only 90% reduction of the mercaptan. Thereafter, the quantity of ethylene oxide was doubled to 6 grams per 100 of the original solution and the shaking continued for an additional hour and the mercaptan content was only 92% reduced. The solution was allowed to stand for 6 hours and the mercaptan content was 99% reduced. It was then allowed to stand for 24 hours and the mercaptan was found to be 100% reduced.

EXAMPLE VI

The composition of Example V was heated under reflux at 60° C. with 2 grams of ethylene oxide and analyzed after 15 minutes and there was found to be no mercaptan sulfur present. The heating was continued for a period of 2 hours at 60° C. and ethylene oxide was distilled off recovering most of the theoretical excess, about 1 gram. This experiment indicated that heating at a temperature of 60° C. quickly drives the reaction to completion but heating at that temperature for a long period of time does not cause the phenol present to react with the ethylene oxide whereby it is clear that the reaction is indeed selective.

EXAMPLE VII

A 50 ml. portion of fraction No. 3 of Example II containing 6.5% of mercaptan was mixed with 50 ml. of ethylene oxide at an initial temperature of 0° C. The reaction mixture was held for 4 hours at 60° C. under reflux. Thereafter 20 ml. of excess ethylene oxide was recovered by distillation. The reaction product comprised 60 ml., sp. gr. 1.0407, and after analysis was found to have no mercaptan.

EXAMPLE VIII

The thio ether containing reaction product of Example VII was distilled first at atmospheric pressure at 405° F. to remove unreacted phenols and the residue was further distilled in vacuum. A fraction boiling at 514° F. at 750 mm. Hg was recovered. This appeared to be the beta hydroxy ethyl ether of thiophenyl sulfide, as in Equation 1 above. It analyzed 61.1% carbon, 6.3% hydrogen and 19.2% sulfur and had a freezing point of 10° F. Another fraction recovered at a boiling point of 530–535° F. and 751 mm. Hg appeared to correspond to beta hydroxy ethyl m-tolyl sulfide as illustrated in Equation 2 above. It analyzed 63.8% carbon, 7.1% hydrogen and 18.7% sulfur. The beta hydroxy ethyl phenyl sulfide was mixed in equal volume with a synthetic mixture of 50% toluene and 50% N-heptane. The mixture was shaken and the extract analyzed by distilling the hydrocarbon from the extract. It was found to comprise 98% toluene and the raffinate analyzed 98% N-heptane thereby indicating that the hydroxy alkyl thiophenyl ether is a highly selective solvent for separation of aromatic from aliphatic hydrocarbon contained as a mixture in a hydrocarbon naphtha.

EXAMPLE IX

The beta hydroxy ethyl meta tolyl sulfide of Example VIII was added in quantity of 0.1% by weight to a sweet thermally cracked gasoline having an induction period of 60 minutes at 212° F. under 100 p.s.i. oxygen pressure and a copper dish gum of 35 mg./100 ml. and was found thereafter to have an induction period of 4½ hours under these conditions and a copper dish gum of 7 mg./100 ml.

EXAMPLE X

The reaction of Example III was repeated substituting propylene oxide for the ethylene oxide. Heating the mercaptan containing phenol fraction as in that example at 60° C. for 45 minutes gave zero mercaptan.

I claim:

1. The method of separating aromatic from aliphatic hydrocarbon contained in a hydrocarbon naphtha mixture comprising extracting the aromatic hydrocarbon components with a compound selected from the group consisting of beta hydroxy ethyl phenyl sulfide and beta hydroxy ethyl m-tolyl sulfide.

2. The method defined in claim 1 wherein the essential extraction solvent is beta hydroxy ethyl phenyl sulfide.

3. The method defined in claim 1 wherein the essential extraction solvent is beta hydroxy ethyl tolyl sulfide.

References Cited in the file of this patent

UNITED STATES PATENTS

| | | |
|---|---|---|
| 2,407,820 | Durrum | Sept. 17, 1946 |
| 2,568,159 | Medcalf et al. | Sept. 18, 1951 |

FOREIGN PATENTS

| | | |
|---|---|---|
| 463,834 | Canada | Mar. 21, 1950 |

OTHER REFERENCES

Fromm et al.: Chem. Abstracts, vol. 15, pages 2062, 1921, Ber. vol. 54B, pages 320–6, 1921.